F. B. HOWELL.
DYNAMO ELECTRIC MACHINE.
APPLICATION FILED DEC. 30, 1909.
1,001,643.
Patented Aug. 29, 1911.
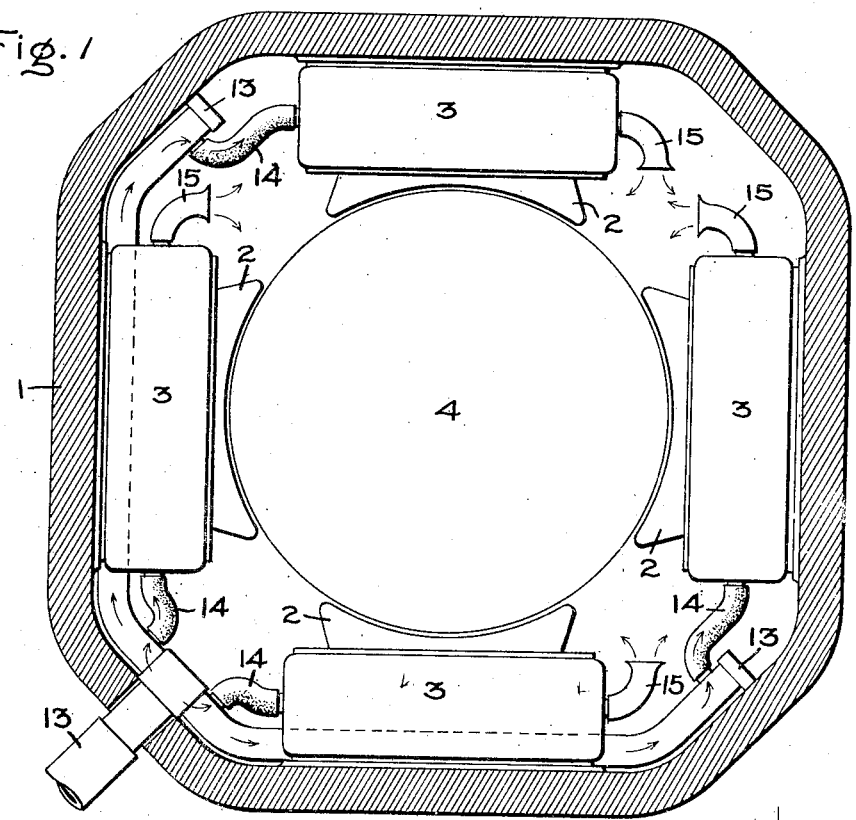
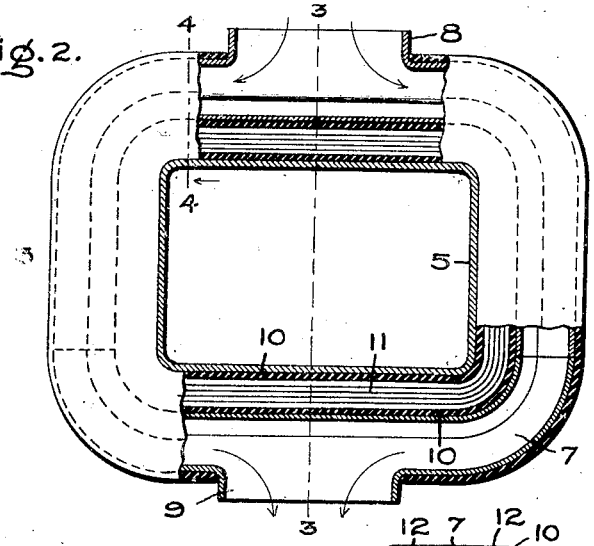
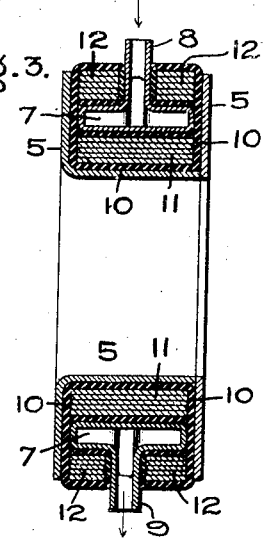
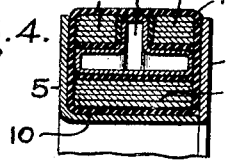
Witnesses:
Marcus L. Byng
J. Ellis Glen
Inventor:
Fred B. Howell,
by Albert G. Davis
His Attorney.

UNITED STATES PATENT OFFICE.

FRED B. HOWELL, OF SCHENECTADY, NEW YORK, ASSIGNOR TO GENERAL ELECTRIC COMPANY, A CORPORATION OF NEW YORK.

DYNAMO-ELECTRIC MACHINE.

1,001,643.     Specification of Letters Patent.     Patented Aug. 29, 1911.

Application filed December 30, 1909. Serial No. 535,669.

*To all whom it may concern:*

Be it known tha I, FRED B. HOWELL, a citizen of the United States, residing at Schenectady, county of Schenectady, State of New York, have invented certain new and useful Improvements in Dynamo-Electric Machines, of which the following is a specification.

My invention relates to dynamo-electric machines and more particularly to field coils for such machines.

Heretofore, in ventilating field coils of dynamo-electric machines, ducts have been provided extending through the coil and through the spool surrounding the coil. My construction is an improvement over this and is particularly adapted for use in field coils of direct current dynamo-electric machines, which operate at a high potential and have field windings that are, therefore, difficult to properly insulate.

It is the object of my invention to provide an efficient arrangement for ventilating and insulating the field coils of such machines.

To this end my invention consists of a field coil for dynamo-electric machines comprising a winding and ventilating means therefor consisting of an inclosed tube embedded therein and provided with inlet and outlet openings.

Other features of novelty which characterize my invention are pointed out with particularity in the claims annexed to and forming a part of this specification.

For a better understanding of my invention, reference may be had to the following description taken in connection with the accompanying drawing, in which—

Figure 1 is a section of a dynamo-electric machine provided with field coils, embodying my invention; Fig. 2 is a view of my field coil with parts broken away and in section; Fig. 3 is a section on the line 3—3 of Fig. 2, and Fig. 4 is a section on the line 4—4 of Fig. 2.

Referring to the drawing, the frame 1 of the dynamo-electric machine has fastened thereto poles 2, upon which are mounted field coils 3. The armature 4 is designed to revolve within the poles 2. Each field coil 3 comprises a spool 5, upon which is placed the winding of the field coil. The inclosed tube 7 is embedded in this winding and is provided with an inlet opening 8 on one side of the winding and an outlet opening 9 on the other side of the winding. The tube 7 and the winding of the field coil are separated from the spool 5 by suitable insulation 10. This tube may be formed of steel and in two parts as shown in Fig. 2, one part which has the inlet opening 8 in its side, being U-shaped and fitting into one side and two ends of the winding, and the other part, which preferably has the outlet opening 9 in the middle of its side fitting into the other side of the winding so as to complete a ventilating passage around the coil. The winding of the field coil is wound, a portion 11 about the inner part of the spool and two portions 12 about the upper part of the spool and the tube 7 and on both sides of the openings 8 and 9.

I have shown in Fig. 1 a dynamo-electric machine having four field coils in each of which is embedded a ventilating tube. The inlet openings 8 of these tubes are connected in parallel to a source of cooling fluid, such as air, which may be under pressure, by means of a system of piping 13. By connecting the tubes in parallel to the source of cooling fluid, each field coil is cooled by fluid which has not previously been used for cooling, as would be the case if the tubes were connected in series. Each inlet opening 8 is connected to the piping system by means of a piece of pipe 14 made of insulating material, such as rubber, so that the tubes are insulated from the piping system and, therefore, from "ground." The outlet openings 9 of the tubes may be provided with parts 15 which direct the cooling fluid against the armature 4 of the dynamo-electric machine after it has flowed through the tubes.

I desire it to be understood that my invention is not limited to the particular construction shown and described and I aim in the appended claims to cover all modifications which do not depart from the spirit and scope of my invention.

What I claim as new and desire to secure by Letters Patent of the United States, is,—

1. In a dynamo-electric machine, a field coil comprising a spool, a winding thereon, and ventilating means therefor consisting of an inclosed tube, said winding comprising a plurality of portions, one portion of said winding being wound about the inner part of the spool and another portion being wound about said tube whereby the tube is embedded in the winding, said tube being provided with inlet and outlet openings.

2. In a dynamo-electric machine, a field coil comprising a spool, a winding thereon, and ventilating means therefor consisting of an inclosed tube having inlet and outlet openings, said winding consisting of a plurality of portions, one of said portions being wound about the inner part of the spool and the other portions being wound about said tube and on both sides of the openings therein whereby the tube is embedded in the winding.

3. In a dynamo-electric machine, a field coil comprising a spool, a winding thereon, ventilating means therefor consisting of an inclosed tube having inlet and outlet openings, and insulation separating said tube from said spool, said winding consisting of a plurality of portions, one of said portions being wound about the inner part of the spool and another of said portions being wound about said tube whereby the tube is embedded in the winding.

4. In a dynamo-electric machine, an armature, a field coil comprising a winding and ventilating means therefor consisting of an inclosed tube embedded in said winding, said tube being provided with inlet and outlet openings, and means for supplying cooling fluid to said inlet opening, said outlet opening directing the cooling fluid flowing through said tube against said armature.

5. In a dynamo-electric machine, an armature, a field coil comprising a spool, a winding thereon, ventilating means therefor consisting of an inclosed tube having inlet and outlet openings, said winding consisting of a plurality of portions, one of said portions being wound about the inner part of said spool and another of said portions being wound about said tube whereby the tube is embedded in the winding, and means for supplying cooling fluid to said inlet opening, said outlet opening directing the cooling fluid flowing through said tube against said armature.

In witness whereof, I have hereunto set my hand this 29th day of December, 1909.

FRED B. HOWELL.

Witnesses:
BENJAMIN B. HULL,
HELEN ORFORD.